United States Patent [19]

Hawkes

[11] Patent Number: 4,471,207

[45] Date of Patent: Sep. 11, 1984

[54] APPARATUS AND METHOD FOR PROVIDING USEFUL AUDIO FEEDBACK TO USERS OF ARC WELDING EQUIPMENT

[75] Inventor: Graham S. Hawkes, Oakland, Calif.

[73] Assignee: Deep Ocean Engineering Incorporated, Oakland, Calif.

[21] Appl. No.: 493,421

[22] Filed: May 10, 1983

[51] Int. Cl.³ .............................................. B23K 9/10
[52] U.S. Cl. ........................... 219/130.01; 219/137 PS
[58] Field of Search ...................... 219/130.01, 137 PS

[56] References Cited

U.S. PATENT DOCUMENTS 3,679,865  7/1972  Jesnitzer et al. ............... 219/130.01

FOREIGN PATENT DOCUMENTS 2811737   9/1979  Fed. Rep. of Germany ........................ 219/130.01
2813260  10/1979  Fed. Rep. of Germany ........................ 219/130.01
46-12893  4/1971  Japan .............................. 219/130.01
556908   11/1977  U.S.S.R. ........................... 219/130.01

Primary Examiner—C. C. Shaw
Attorney, Agent, or Firm—Manfred M. Warren; Robert B. Chickering; Glen R. Grunewald

[57] ABSTRACT

The user of electric arc welding equipment is provided with audible feedback signals which provide useful information relating to the output current and voltage of the welder. An audio tone is generated and is frequency modulated by a signal which corresponds to welder output voltage. The tone is amplitude modulated by a signal corresponding to output current thus providing the user with a synthesized feedback signal having a voltage-proportional pitch and current-proportional volume. Additional modulation means are disclosed for introducing a current-proportional warble component to said tone.

14 Claims, 2 Drawing Figures

FIG.—1

APPARATUS AND METHOD FOR PROVIDING USEFUL AUDIO FEEDBACK TO USERS OF ARC WELDING EQUIPMENT

BACKGROUND AND FIELD OF THE INVENTION

The present invention generally relates to devices for improving user control of arc welding equipment. In particular, the invention relates to audible feedback systems utilized in connection with remotely operated arc welding equipment.

Arc welding is widely used in the fabrication and repair of metallic structures. In a normal arc welding situation the user learns to control the electrode so as to produce a satisfactory weld by watching and listening. A skillful arc welder learns to recognize the sights and sounds associated with a good weld. Remotely operated welding equipment is used when hostile environments preclude the safe and efficient use of human workers at the site of the welding. In these situtations the remotely situated user effects the desired welding operation through the use of remotely operated power driven manipulators such as "robot arms" and the like. Users of remotely operated manipulators traditionally monitor manipulator position and welding operations through the use of closed circuit television. This enables the operator to see the effects of his control inputs in real time and make appropriate adjustments. Video feedback systems do not, however, provide the same amount of information concerning the welding operation as is available to a welding operator in a typical on-site situation.

Various schemes exist in the prior art for providing user feedback information on force, speed, displacement and other motion related parameters. While these feedback systems (such as the one disclosed in applicants' co-pending application Ser. No. 466,433 filed Feb. 15, 1983) systems aid in user control of the manipulator arms, they are not directly related to the welding operation and serve only to improve control of the manipulator arm.

SUMMARY OF THE INVENTION

In contrast to the aforementioned systems, the present invention provides feedback in the form of audible sound directly related to variables in the welding operation itself. The instant invention supplements the visual feedback systems of the prior art with an audible sound input to the operator which, through various combinations of frequency and amplitude modulation, conveys information concerning the welder voltage and current during welding operations. The essential principles of the invention can be used with all types of arc welding systems including A.C. and D.C., whether locally or remotely controlled. When used with remotely operated systems, the present invention can provide useful information to the operator without requiring the use of special remotely mounted transducers or sensors. Welder voltage can be monitored to provide a welding voltage signal and welder current can be similarly monitored to provide a current proportional signal. The voltage signal can be used to frequency modulate an audio tone and the current signal can be used to amplitude modulate the tone. The resultant synthesized tone, while not absolutely analogous to the sight and sound information available to on-site welders, nevertheless provides highly useful information which, with training, significantly improves the quality, speed, and efficiency of both remotely and locally performed arc welding operations. By sensing welder voltage and current at the welder power supply itself, which is typically located in close proximity to the user, a need for extra cabling or telemetry devices for relaying information from the site of the welding operation itself is eliminated.

Additionally, the instant invention affords a heretofore unavailable means for documenting and recording arc welding operations. The synthesized audio signal generated by the device of the instant invention can be recorded simultaneously with a video signal from a camera which is used to record a picture of the welding operation as it is performed. The resultant recording can be played back and examined to review the welding operation. The synchronized audio portion of the recording provides information relating to weld quality which would otherwise be unavailable in a video only recording.

OBJECTS OF THE INVENTION

Accordingly, it is an object of the present invention to provide a feedback apparatus and method for supplying information to the user of arc welding equipment by generating appropriately modulated sound signals which can be interpreted by the operator and used to improve control of the welding operation.

A further object of the present invention is to provide a user feedback system which, when utilized with remotely operated welding equipment, provides information which is directly related to the arc welding operation itself and supplements video information obtained from television cameras.

A still further object is to provide a feedback system which allows a user to control a remotely operated arc welder with precision and speed heretofore unobtainable in a system of comparable symplicity.

Another object of the present invention is to provide an audio feedback system which is readily adaptable for use with all types of electric arc welders.

The apparatus and method of the instant invention has other objects and features of advantage which will be set forth in and become apparent from the following description of the preferred embodiment and the accompanying drawings.

DETAILED DESCRIPTION OF THE INVENTION

Figure 1:
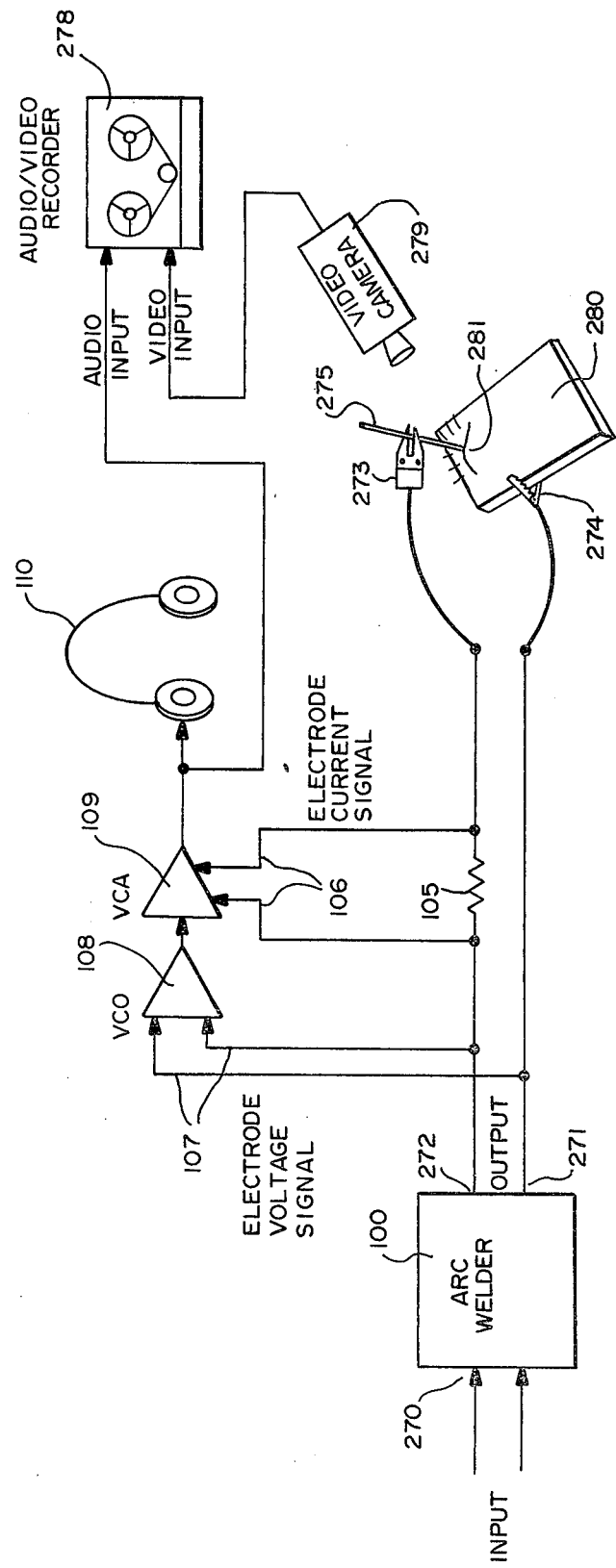
FIG. 1 is a block functional diagram of an apparatus embodying the present invention.

Referring to FIG. 1, an audio feedback system is illustrated for monitoring and aiding in user control of arc welding equipment. For purposes of simplicity, a simple form of the invention is illustrated using a voltage controlled amplifier and voltage controlled oscillator to generate the audio signal.

In FIG. 1, an arc welder power supply 100 is illustrated having an input 270 and outputs 271 and 272. In the preferred embodiment, welder 100 is an A.C. powered D.C. output arc welder. The outputs 271 and 272 supply direct current to electrode holder 273 and workpiece grounding clamp 274. The welder 100, in the preferred embodiment, is a transformer type power supply employing rectifiers to produce a high current D.C. output suitable for arc welding.

In FIG. 1, output 272 from welder 100 is connected to electrode holder 273 which is used to hold the welding rod 275. An electrical signal proportional to welding electrode current is developed across current sensor 105. In practice, the current sensor need be nothing more than a resistor in series with the welder output lead. This provides a voltage drop across the resistor which is proportional to welding current and thus can be utilized as an electrode current signal 106. Fifty millivolt remote ammeter shunts of suitable current ratings can be used as sensor 105 and will not cause large voltage drops which would interfere with the welding operation.

An electrical signal 107 proportional to welder voltage is provided by sampling welder output voltage. This voltage signal 107 is proportional to electrode voltage and is used as the control input to voltage controlled oscillator (VCO) 108. Accordingly, VCO 108 provides an output which is frequency modulated in proportion to the voltage signal 107 thus providing at the output of 108 an oscillator signal having a frequency which varies in proportion to welder voltage.

Voltage controlled amplifier (VCA) 109 has as its input the frequency modulated output signal from VCO 108. Welder electrode current signal 106 is connected to the control input of VCA 109. Accordingly, VCA 109 is an amplitude modulator which varies the amplitude of the VCO signal in proportion to the electrode current signal 106. This has the effect of providing a signal whose volume is proportional to electrode current. The output of VCA 109 is connected to headphone 110 for audibly reproducing the frequency and amplitude modulated signal for user listening and interpretation.

As is seen in FIG. 1, the output signal from VCA 109 is also supplied to audio video recorder 278 which is simultaneously recording the video signal from camera 279. Camera 279 is positioned to view workpiece 280 and is focused on the site 281 of the weld.

Figure 2:
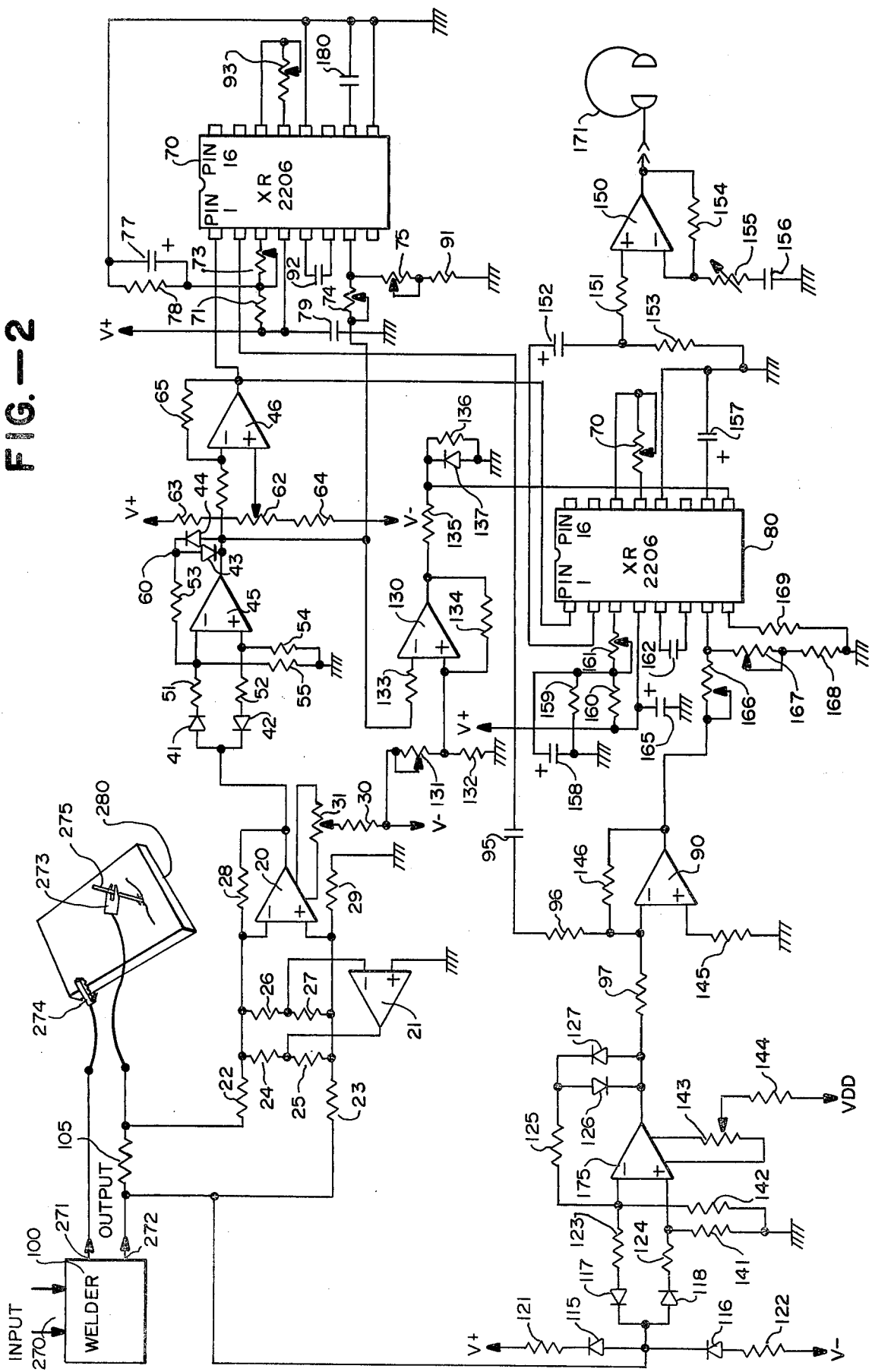
FIG. 2 is an electrical schematic diagram of an embodiment of the present invention.

The circuit functions illustrated in FIG. 1 illustrate a very simple embodiment of the instant invention which is easy to implement and which provides useful information to the operator. It has been found that additional modulative processing can be employed to further increase the usefulness of the instant invention. In FIG. 2 a preferred embodiment is schematically illustrated which employs, in addition to the simple amplitude and frequency modulation processing illustrated in FIG. 1, another processing step which provides a warbling or fluttering effect to the audio output signal. The aural effect at the operator's ears is a warbling or fluttering tone whose frequency rises proportional to electrode voltage and whose amplitude and warble rate are proportional to electrode current. Other additional features which are illustrated in the circuitry of FIG. 2 include provisions for silencing the output so that with no significant electrode current, there is no output to the operator's head set. Other features and options which increase the usefulness of the instant invention will be explained in the following description of the circuitry illustrated in FIG. 2.

As will be explained herein, the method and apparatus of the instant invention can be employed on a variety of types of locally and remotely controlled arc welders including those utilizing A.C., D.C. or various combinations of the foregoing.

The preferred embodiment schematically illustrated in FIG. 2 is designed for use in connection with a D.C. type arc welder suited for underwater deployment. Accordingly, the voltage and current supplied to the electrodes can be monitored to provide useful information concerning the voltage and current of the welding operation as it takes place. In the upper lefthand portion of FIG. 1 welder 100 is shown having an input 270 for receiving electrical power. Output leads 271 and 272 from welder 100 are shown connected to electrode rod holder 273 and ground clamp 274. Resistor 105 is a current sensing resistor in series with output 272 and the rod holder 273 for the purpose of sensing output 272 current and generating a DC voltage proportional thereto. In the preferred embodiment, resistor 105 is a 50 millivolt type ammeter shunt rated for 100 amp full scale meters. The nominal magnitude of welding current ranges from 0 to plus 100 amps. Accordingly, the voltage dropped across resistor 106 due to welding current is 0-50 millivolts DC.

IC 20 and IC 21 are precision integrated circuit (IC) operational amplifiers (OP amps) configured together with their associated resistors 22 through 29 as differential amplifiers. The welding current signal 106 developed across resistor 105 is sensed and amplified by the differential amplifier made up of integrated circuit 20 and integrated circuit 21. IC 21 functions as a summing amplifier which subtracts the Common Mode Voltage seen at resistors 22 and 23 both of which are 20K 0.01% tolerance resistors. Summing amplifier IC 21 thereby lowers the Common Mode input voltage at IC 20 to below specified maximums typical of monolithic linear integrated circuits. Resistors 24, 25, 26 and 27 are all 1K in value.

Resistors 22, 23, 24 and 25 form a differential voltage divider and should therefore employ matched resistors with low temperature coefficients. The functional block created by IC 20 and IC 21 creates a low-cost, high voltage differencing amplifier with 20 dB gain. The output voltage gain is determined by the ratio of resistor 28 to resistor 22. In the preferred embodiment resistor 28 is a 200K 1% resistor as is resistor 29.

Resistor 30 and potentiometer 31 which are 2K and 200K respectively in value form an input offset control which may be omitted if the precision OP amp used as IC 20 has sufficiently low input offset voltage. IC 20 should be selected for high CMRR, low input offset voltage and current, with low $V_{os}$ drift such as OP 07, LF 363, AD 521, or other OP amps.

The output of IC 20 is direct coupled to a precision rectifier comprised of diodes 41, 42, 43 and 44 together with IC 45 and resistors 51, 52, 53, 54 and 55. The aforementioned diodes are silicon small signal types (1N4148 or equivalent) which rectify the input current. IC 45 is an OP amp configured an inverting unity gain amplifier. Resistors 51 through 55 are all 10K 1 percent types. When the input voltage to IC 45 is positive, diode 41 conducts, producing, at point 60, a voltage equal to $-(+V+I_{in}R_{D41})$, where $R_{D41}$ is the forward biased diode resistance of diode 41 and $I_{in}$ is the input current. Because the amplifier gain is unity, $I_{in}$ equals $I_{out}$. The voltage appearing at the output of IC 45 is the sum of the voltages at point 60 and the drop across forward biased diode 44. The output voltage from 0 integrated circuit 45 is accordingly equal to $-(+V+I_{out}R_{D41})+I_{out}R_{D44}$. For negative inputs diode 42 conducts and produces voltage $(-V-I_{in}R_{D42})/2$ at the noninverting input of IC 45.

Because the potential difference across the two inputs of IC 45 is 0 volts, the voltage at both inputs is the same. Since diode 41 is reversed biased, there is no current flow through resistor 51. Therefore the voltage at the inverting input of IC 45 is due to the voltage divider created by resistors 53 and 55. This produces a voltage $(-V-I_{out}R_{D42})$ at point 60. Diode 44 adds an additional voltage of $I_{out}R_{D44}$ volts. The output is again equal to $-V$. Diode 43 eliminates latch-ups by allowing the output to drive the inverting input negative when the input voltage is approximately equal to 0 volts. Diodes 41 through 44 should be matched for $V_f$ and resistors 51 through 55 should be 1% metal film types. IC 45 may be a low-cost general purpose OP amp, LM741 or equivalent. Input offset triming may be accomplished by the circuitry shown for IC 175.

The output from IC 45 is negative in polarity and equal in magnitude to the output of the differencing amplifier formed by IC 20. Due to the +20 dB gain achieved in IC 20, the output from IC 45 is $-10\,V_{R16}$. IC 46 is configured as a direct coupled inverting amplifier with a gain of 10 dB. Potentiometer 62 and associated resistors 63 and 64 form an adjustable offsetting input to IC 46 and reference the output voltage to $V+/2$ which is the zero reference for the AM input of VCO IC70. Potentiometer 62 is in the preferred embodiment a 200K pot. Resistors 63 and 64 are 6.8K in value.

IC 70 and IC 80 are both EXAR 2206 monolithic IC Function Generators capable of producing sine, triangle, or square wave outputs. IC 70 and IC 80 are shown in outlined form so that the pin arrangement seen in FIG. 2 corresponds to the pin arrangement on the actual chip itself. Pins 1 and 16 are labeled on both IC 70 and IC 80 to show that pin numbering starts at 1 and proceeds sequentially counterclockwise to pin number 16. References to pin numbers on IC 70 and IC 80 are references made to the actual chip pin numbers. The output of IC 70 at pin 2 is a low-frequency sine wave whose voltage and frequency vary with the magnitude of the output voltage at IC 46. Resistor 65 is a feedback resistor for IC 46 and has a value of 33K. Due to the gain developed in IC 46, the output voltage at pin 2 of IC 70 drives the output stage to saturation before the welding current reaches its full range however the output frequency continues to rise. Potentiometer 73 shown connected to pin 3 of IC 70 sets the gain of the output at pin 2 of IC 70. Potentiometer 73 is a 200K pot and resistor 71 is 5.1K. Resistor 78 is also 5.1K and is paralleled by capacitor 77 which is a 10 microfarad 10 volt capacitor. Capacitor 79 is a one microfarad capacitor. Potentiometer 74 is a 25K pot and potentiometer 75 is 200K with a 1K resistor 91 placed in series with ground. The ranges and values of potentiometers 74 and 75 and capacitor 92 may be adjusted to achieve appropriate scaling of the desired output signal. Potentiometer 93 is a 500 ohm pot which allows adjustment of the sine wave shape to minimize distortion.

The low-frequency sine wave output of IC 70 is A.C. coupled to IC 90 through capacitor 95 and resistor 96 which have values of 10 microfarads and 10K ohms respectively. IC 90 is a unity gain summing inverting amplifier. This amplifier sums the signals developed across resistor 96 and 10K ohm resistor 97. IC 90 is an absolute value circuit similar to the one discussed in connection with IC 45. Diodes 115 and 116 and their associated 1K ohm resistors 121 and 122 form an input protection circuit to prevent voltage spikes or inadvertent high voltages from damaging the inputs to IC 175. Resistors 123 and 124 are 10K 1% tolerance resistors and together with diodes 117 and 118 perform the same function as do the related components in the input circuit to IC 45. Similarly, feedback resistor 125 is a 10K 1% tolerance resistor. Diodes 126 and 127 are similar in type and circuit function to the previously described diodes 43 and 44 which are used on the output of IC 45. 85 The summed inverted output of IC 90 provides the frequency sweep control voltage at pin 7 of IC 80. The magnitude of the output modulated signal from IC 80 is determined by the DC voltage at pin 1 of IC 80. This voltage has been established by the output of IC 46 and is proportional to welding electrode current. Accordingly, the output signal at pin 2 of IC 80 is a sine wave swept across a mid range frequency band, i.e., (400 hertz to 4 kilohertz) when driven by a 0 to 50 volt welder voltage signal from welder 100. This sine wave is modulated by the low-frequency AC output generated in IC 70. The amplitude of the swept modulated output is determined by a DC control signal proportional to the electrode current signal developed across resistor 105. The output at pin 2 of IC 80 is AC coupled to a low power audio amplifier with a variable gain capable of powering standard headphones.

The aural effect heard by the user through the headphone is a warbling or fluttering tone whose frequency rises proportional to welder electrode voltage and whose amplitude and warble rate are proportional to welder electrode current. With no load the output to the user's headset is 0 volts. The amplitude control signal at pin 1 of IC 80 is weighted to produce a steeply rising output voltage over the lower range of welder electrode current values (e.g. less than plus or minus 50 amp). As electrode currents rise above this range, the effect becomes less noticeable, given the operator greater sensitivity to current changes in the low current range. This characteristic may be adjusted then modified by selecting resistor values and may be changed to give greater linearity or greater sensitivity as may be appropriate for controlling the welding operation in different situations.

IC 130 is configured as a comparator with an output clamp whose input is driven by the electrode current signal. The switching point is set at approximately minus 3.0 volts by the ratio of the 10K potentiometer 131 and the 33K resistor 132. Input resistor 133 is a 4.7K current limiting resistor placed in series between the output of IC 45 and the inverting input of IC 130. Feedback resistor 134 is a 3.3 megohm unit connected between the output and the noninverting input of IC 130. When the input to IC 130 taken between potentiometer 131 and resistor 132 drops below negative 3.0 volts, the output switches from $V-$ to $V+$. Due to the diode clamp and voltage divider circuit formed by 68k resistor 135, 33k resistor 136, and diode 137. The comparator output switches from approximately $-0.7$ volts to $+5.0$ volts. This provides a logic level control signal to the FSK input at pin 9 of IC 80. When the comparator IC 130 switches, pin 9 on IC 80 goes high which switches the output of IC 80 to a steady state sine wave. This gives the operator a positive indication when the welder electrode current magnitude reaches a preset limit as defined by the ratio of the resistances 131 to 132. Potentiometer 131 may be adjusted to change this threshold as is required in different applications.

The XR 2206 is a commonly used monolithic function generator and hence the methods for selecting the values of the associated timing resistors and capacitors are well documented in the manufacturer's literature. Circuit component values given herein have been found satisfactory when used in connection with the embodiment illustrated in FIG. 2. The values of the remaining components associated with the IC OP amps will be given for purposes of completeness. Resistors 141 and 142 are both 10K and perform identical functions to resistors 54 and 55 associated with IC 45. Potentiometer 143 is a 200K pot in series with a 2K resistor 144. Resistor 145 is connected between the noninverting input of IC 90 in ground and has a value of 3.3K. IC 90 is configured as a 0 dB summing amp. Feedback resistor 146 has a value of 10K. IC 150 is used to amplify the output from IC 80 to a level suitable for driving headphones. Input resistor 151 is 1K. Capacitor 152 is a 20 microfarad device. Resistor 153 has a value of 100K. Feedback resistor 154, connected between the input and output of IC 150, is a 10K resistor. Potentiometer 155 is a 20K pot in series with a 10 microfarad capacitor 16. Capacitors 157 and 158 are both 10 microfarad units. Capacitor 180 is a 1 microfared unit. Resistors 159 and 160 are both 5.1K. Potentiometer 161 is a 200K pot. Timing capacitor 162 connected between pins 5 and 6 of IC 80 is a 1 microfarad device. Timing capacitor 92 connected between pins 5 and 6 of IC 70 is a 10 microfarad device. Capacitor 165 is a one microfarad device. Potentiometer 166 has a value of 25K ohms. Potentiometer 167 is a 200K pot in series with resistor 168 which has a value of 5K ohms. Resistor 169 is a 4.7K unit. Potentiometer 170 is connected between pins 13 and 14 of IC 80 and is a 500 ohm unit used to adjust for minimum sine wave distortion. Headphone 171 is driven by the output of audio amplifier 150.

Another alternative means of deriving welder current signals include the use of welder input current sensors. In A.C. welders the voltage and current signals can be rectified and filtered (if needed) to provide suitable D.C. control signals for modulating the various amplifiers and oscillators.

In FIG. 1 it is seen that the means responsive to welding electrode voltage is simply a direct connection to the welder voltage output.

The circuitry shown in FIG. 2 has an additional feature not shown in the basic embodiment illustrated in FIG. 1. In FIG. 2, IC 70 and IC 80 are configured together to provide, in addition to the before mentioned amplitude and frequency modulation features shown in FIG. 1, an additional modulation means for repetitively varying the frequency of the output from IC 80 at a repetition rate proportional to welding electrode current. It would be possible to instead provide a repetitive variation of a user detectable output characteristic other than frequency. Instead of warbling the output frequency a variable rate gating could be used to pulse the output or, alternatively, other user detectable characteristics such as harmonic content could be varied through the use of filters or other well known methods. In FIG. 2, the output from IC 80 is sweep frequency modulated up and down to produce a warble effect having a repetition rate proportional to the current signal derived from the welder output current sensed by resistor 105. The summed inverted output of IC 90 provides the frequency sweep control voltage at pin 7 of IC 80. This frequency sweep control voltage can be varied for adjusting the bandwidth over which the output frequency of IC 80 is swept. Referring to FIG. 2, the output from headphone amplifier 150 is heard by the user as a warbling tone having a center frequency proportional to welding electrode voltage. The term center frequency is used to refer to the pitch of the speed proportional tone. The warble component varies this pitch up and down at a warble rate proportional to welding electrode current. The warbling tone has an amplitude or volume which is proportional to electrode current. In FIG. 2, IC 80 is coupled to welding current signals in such a way that with negligable load the output from IC 80 is zero volts. In this way means are provided for silencing audible outputs from the generator formed by IC 70 and 80 when signals indicating substantially zero welding current are detected.

What is claimed is:

1. An audio feedback system for monitoring and aiding in user control of electric arc welding equipment comprising:
    means providing an electrical signal proportional to welding electrode current;
    means providing an electrical signal proportional to welding electrode voltage;
    a signal generator;
    frequency modulation means connected to one of said electrical signals for varying the output frequency of said signal generator in proportion to said signal;
    amplitude modulation means connected to the other of said electrical signals for varying the output amplitude of said signal generator in proportion to said other signal; and
    means for audibly reproducing the output of said signal generator.

2. The device of claim 1 wherein:
    said arc welding equipment supplies direct current at its output;
    said first named means is a welder output current sensor;
    said second named means is a welder output voltage sensor;
    said amplitude modulation means is connected to said first named electrical signal; and
    said frequency modulation means is connected to said second named electrical signal.

3. The device of claim 2 wherein:
    said electrical signals are D.C. voltages.

4. The device of claim 1 wherein;
    said arc welding equipment supplies alternating current at its output;
    said first named means is a welder output current sensor;
    said second named means is a welder output voltage sensor;
    said first named electrical signal is rectified;
    said second named electrical signal is rectified;
    said amplitude modulation means is connected to said rectified first named electrical signal; and
    said frequency modulation means is connected to said rectified second named electrical signal.

5. The device of claim 1 wherein:
    said first named means is a welder input current sensor.

6. The device of claim 1 further comprising:
    additional modulation means connected to one of said electrical signals for repetitively varying a user-detectable output characteristic of said signal generator at a repetition rate proportional to said electrical signal.

7. The device of claim 6 wherein:

said user-detectable output characteristic is frequency; and said additional modulation means is a sweep frequency modulator for repetitively sweeping the output frequency of said generator up and down to produce a warble effect having a warble repetition rate proportional to said connected electrical signal.

8. The device of claim 7 wherein:

said sweep frequency modulator is connected to said first named electrical signal for producing a signal generator output frequency warble having a repetition rate proportional to welding electrode current.

9. The device of claim 8 wherein the audibly reproduced output of said signal generator is a warbling tone having a center frequency proportional to welding electrode voltage, a warble rate proportional to welding electrode current, and an amplitude proportional to welding electrode current.

10. The device of claim 1 further comprising:

gating means connected to said signal generator and connected to said current proportional electrical signal for silencing generator output when a signal indicating substantially zero welding current is detected.

11. A method for providing useful audio feedback to users of arc welding equipment comprising:

generating an electrical signal proportional to welding electrode current;

generating an electrical signal proportional to welding electrode voltage;

generating an audio tone;

varying the amplitude of said tone in proportion to one of said signals; and varying the frequency of said tone in proportion to the other of said signals.

12. The method of claim 11 wherein:

the amplitude of said tone is varied in proportion to said first named signal; and the frequency of said tone is varied in proportion to said second named signal.

13. The method of claim 12 further comprising:

cyclically varying the frequency of said tone at a repetition rate proportional to said first named signal.

14. A method for documenting and recording electric arc welding operations comprising:

generating a synthesized audio signal having an amplitude proportional to welding electrode current and a frequency proportional to welding electrode voltage;

using a video camera and video recorder to record a picture of the arc welding operation;

recording said synthesized audio signal simultaneously with said video recording for synchronized playback of said audio signal and a video picture of the welding operation which produced said signal.

* * * * *